United States Patent [19]

Vitou

[11] 4,026,651
[45] May 31, 1977

[54] CAMERA STRUCTURE

[76] Inventor: Constantine Kyro Vitou, 2101 Graham Boulevard West, Montreal, Quebec, Canada

[22] Filed: Aug. 4, 1975

[21] Appl. No.: 601,743

[30] Foreign Application Priority Data

Aug. 14, 1974 United Kingdom ............. 35867/74

[52] U.S. Cl. .................................. 355/44; 355/55; 355/71; 355/74; 354/236
[51] Int. Cl.[2] .................. G03B 13/24; G03B 13/26
[58] Field of Search ................. 355/18, 21, 27, 39, 355/44, 55, 72, 74, 77, 71; 354/80, 284, 188, 174, 176, 236, 283, 285, 250, 125

[56] References Cited

UNITED STATES PATENTS

| 1,155,142 | 9/1915 | Gates | 355/44 |
| 2,654,289 | 10/1953 | Flynn | 355/74 X |
| 3,644,036 | 2/1972 | Canfield | 355/44 |

FOREIGN PATENTS OR APPLICATIONS

| 1,373 | 6/1856 | United Kingdom | 354/250 |

*Primary Examiner*—John Gonzales
*Attorney, Agent, or Firm*—Robert J. Schaap; Eric Fincham

[57] ABSTRACT

The present invention provides an apparatus for photographically reproducing a positive image such as a previous photograph wherein both the focal length and the length from the positive image to the lens of the apparatus may be adjusted. The apparatus also includes means whereby two or more positive images may be reproduced on a single frame of film.

2 Claims, 8 Drawing Figures

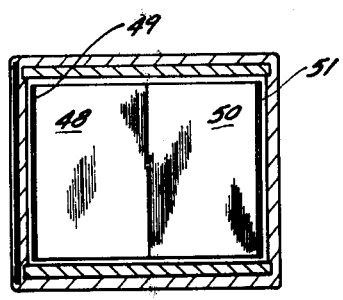
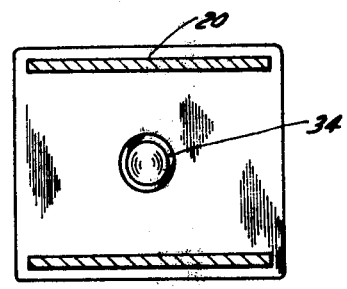
FIG. 5      FIG. 6
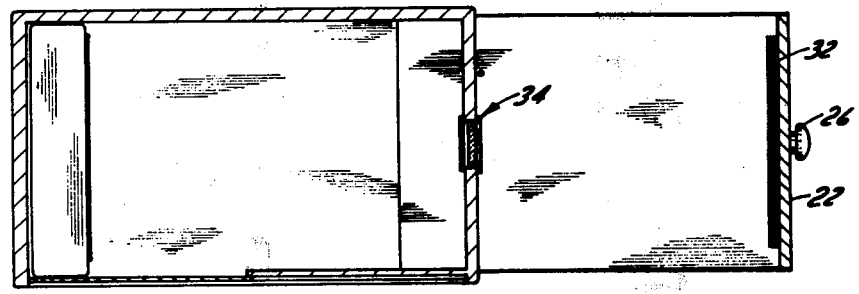
FIG. 4
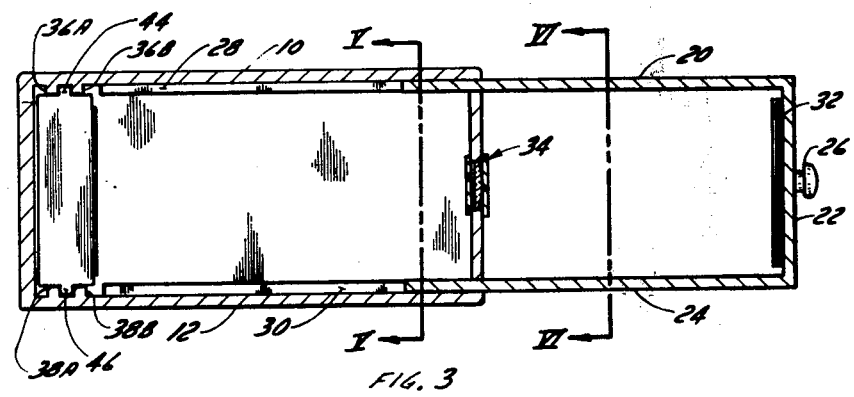
FIG. 3

CAMERA STRUCTURE

The present invention relates to a method and apparatus and more particularly, relates to a method and apparatus suitable for photographically reproducing a positive image.

In the art of photography and related fields, there is often a need for a reproduction of a positive image — i.e. an existing photograph or the like. For example, when a photograph or picture is taken, it is sometimes desired to "blow up" a portion thereof, or in other words, to enlarge such a portion of the existing photograph.

It is also sometimes desirable to reproduce one or more positive images on the same frame of film. In other words, one may wish to produce different positive images or portions thereof on various segments of a single frame of film.

The present invention provides a method and apparatus, which in various aspects thereof, are capable or reproducing one or more positive images on a single frame of film.

According to one aspect of the invention, there is provided an apparatus suitable for reproduction of a positive image, said apparatus comprising a housing, lens means having first shutter means associated therewith mounted within one end of said housing, means within said housing for adjustably mounting a film sub-assembly which includes self-developing film, second shutter means, means for actuating said second shutter means, and an image mounting means associated with said housing and being slidably adjustable to vary the distance from said lens to said image mounting means.

In a further aspect of the present invention, there is provided a method suitable for the reproduction of a positive image comprising the steps of supplying an apparatus which includes a housing, lens means and first shutter means mounted at one end thereof, a film sub-assembly adjustably mounted in said housing and including self-developing film, second shutter means, means for actuating said second shutter means, an opaque focusing plate intermediate said self-developing film and shutter means, and image mounting means slidably adjustable to vary the distance from said lens to said image mounting means, mounting a positive image to be reproduced on said image mounting means, opening said second shutter means, focusing said apparatus by moving said adjustable film sub-assembly and said image mounting means to project the desired image on said focusing plate, closing said second shutter means, removing said focusing plate, sealing said housing to form a light-tight enclosure, reopening said second shutter means, and opening said first shutter means for a desired time to allow the image to be reproduced on a single frame of said self-developing film.

In a further aspect of the present invention, and in particular, in conjunction with the apparatus above described, there may be provided an inserter adapted to be placed between said film means and said shutter and in close proximity to said film means, said inserter plate being substantially parallel to said film and having at least one opaque portion and at least one portion permitting the passage of light.

In greater detail, the apparatus of the present invention includes a housing having a lens mounted in one end thereof. Associated with the lens is a conventional shutter means which may be any suitable including, for example, a focal plane shutter, leaf shutter, or the like. The lens and shutter may thus be a substantially conventional unit including means for a diaphragm control to vary the aperture opening and in addition, an exposure time control. If desired, the lens and associated shutter may be mounted in such a manner so as to be easily replaceable by a further unit. Naturally, means for actuating said shutter are provided.

Adjustably mounted within the housing of the apparatus to receive the light rays passing through the shutter is a film sub-assembly. Generally, the film sub-assembly comprises a self-developing film, an optional focusing plate, a further shutter means apart from the shutter associated with the lens, and means for actuating said shutter means.

Self-developing film is known in the art and may be of the type marketed under the trademark "Polaroid". In the same plane as the film and mounted in close proximity thereto is a removable focusing plate. This focusing plate, as the name implies, is used for focusing of the desired image and is mounted in the film sub-assembly so as to bar any entry of light to the film when it is in place. In one embodiment, the second shutter means associated with the film sub-assembly may function as the focusing plate as will be described hereinbelow.

As aforementioned, the film sub-assembly further includes second shutter means. In the preferred embodiment, these shutter means are not of the conventional "leaf" type for reasons to be discussed hereinafter.

The apparatus may also, optionally include means within the film sub-assembly for mounting an inserter plate to achieve certain desired effects such as the reproduction of a plurality of images on a single frame of a self-developing film.

The film sub-assembly is as aforementioned, adjustably mounted within the housing whereby the focal length of the apparatus may be varied. Any desirable means of achieving the adjustable mounting may be used and to this end, preferably the housing includes means for providing access thereto to adjust the focal length by varying the location of the film sub-assembly.

The housing itself may be formed of any suitable material such as from one of the various synthetic plastics materials or the like.

Associated with the apparatus is means for mounting a positive image in operative relationship to the lens and film sub-assembly. Conveniently, the image mounting means may form a member slidingly engageable with the housing for varying the distance between the image to be reproduced and the lens.

In operation of the apparatus, the positive image to be reproduced is mounted on the image retaining means. The means permitting access to the interior of the housing are then opened as are the second shutter means of the film sub-assembly. The image to be reproduced will then be projected on the focusing plate mounted in front of the self-developing film and the desired focusing of the portion to be reproduced may be achieved through movement of the film sub-assembly and the image retaining means. Once the desired focusing has been achieved, the second shutter means are closed and the focusing plate removed. The housing is then made light tight following which the second shutter means are re-opened and the shutter associated with the lens activated for a desired time period to reproduce the desired image or images.

In conjunction with the above, an inserter plate may be mounted in juxtaposition to the film whereby only a portion of the film frame is exposed.

Having thus generally described the invention, reference will be made to the accompanying drawings illustrating an embodiment thereof, and in which:

FIG. 3 is a side sectional view of the apparatus of FIG. 1;

FIG. 4 is a top elevational view of the apparatus;

FIG. 5 is a cross-sectional view taken along the lines V—V of FIG. 3;

FIG. 6 is a cross-sectional view of the apparatus of FIG. 3 taken along the line VI—VI thereof;

Figure 1:
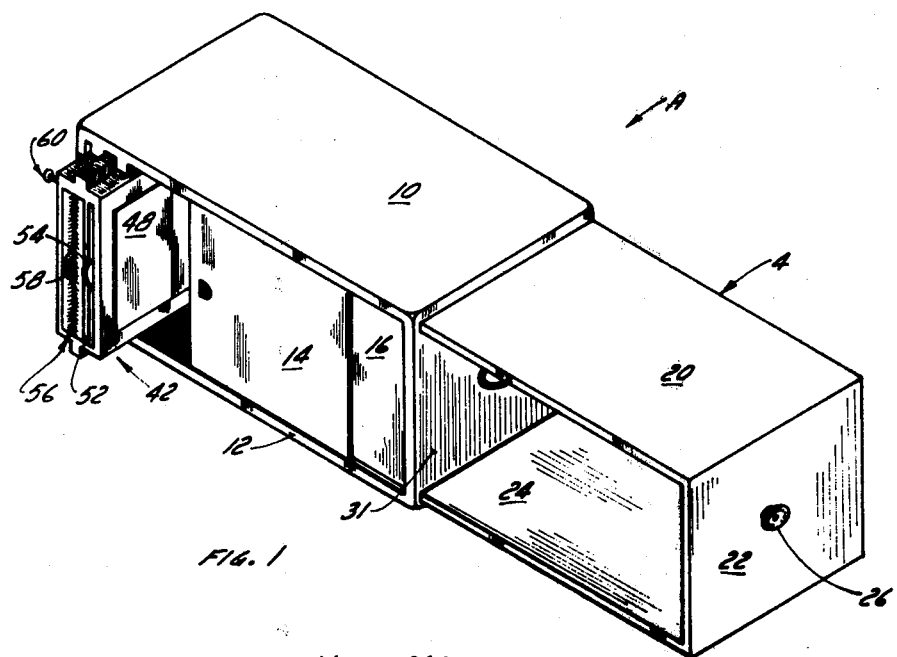
FIG. 1 is a perspective view of one embodiment of the apparatus of the present invention.

Referring to the drawings in greater detail, and by reference characters thereto, one embodiment of the apparatus of the invention is designated by reference character A and which apparatus includes a light-tight housing 2 having a movable image mounting means 4 associated therewith.

Housing 2 has a substantially rectangular configuration in the embodiment illustrated in FIG. 1 and includes top wall 10 and bottom wall 12. As may be seen, a pair of slidable panels 14 and 16 are mounted between top wall 10 and bottom wall 12 on one side of housing 2 thereby providing access to the cavity of the housing. Panels 14 and 16 are, as aforementioned, slidably mounted and are constructed so as to prevent entry of light into the cavity of enclosure 2 when in a closed position.

Image mounting means 4, as shown in FIG. 1, comprises a pair of parallel top and bottom walls 20 and 24, intermediate of which is an end wall 22. End wall 22 has mounted thereon, as shown in FIGS. 3 and 4, a positive image which is to be reproduced. To this end, end wall 22 may include suitable means for mounting and retaining the positive image. Provided on the exteriorly facing surface of end wall 22 is a knob 26 to effect movement of image mounting means 4 in a manner to be discussed hereinafter.

As may be seen from FIG. 3, housing 2 includes, juxtaposed to top wall 10 and bottom wall 14, channels 28 and 30 respectively. Channels 28 and 30 are adapted to receive walls 20 and 24 of image mounting means 4, whereby the distance of image mounting means 4, and in particular end wall 22 which contains retaining means 32, with respect to housing 2 may be varied. In other words, walls 20 and 24 of image mounting means 4 are slidable within channels 28 and 30 respectively.

Mounted within an end wall 31 of housing 2 is a lens 34; lens 34 may comprise any suitable lens and may be chosen from a wide variety of such lens well known to those skilled in the art. Associated with lens 34 is a shutter which may be of the focal plane type or a leaf type. Means not shown for actuating the shutter are provided.

Figure 2:
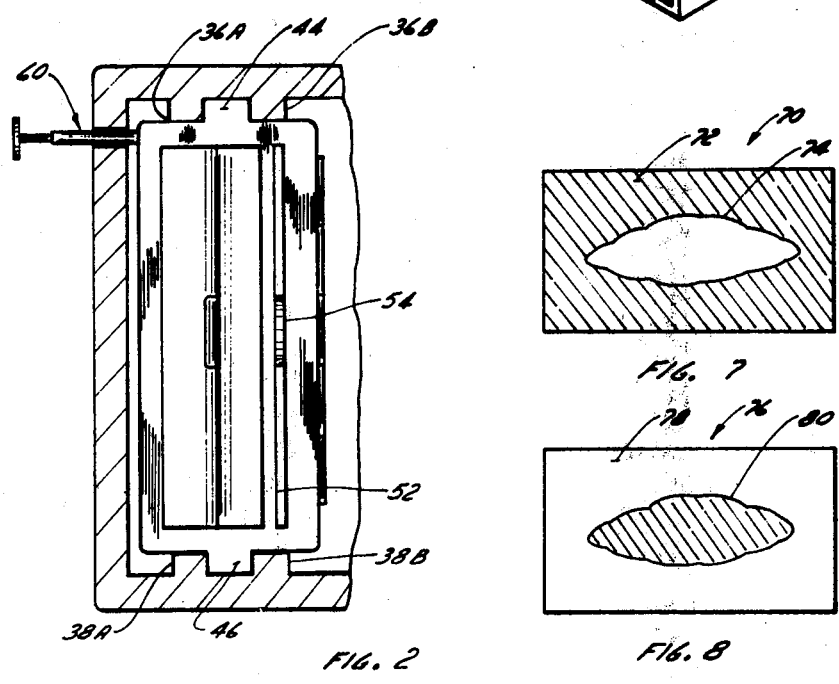
FIG. 2 is a side elevational view of the film sub-assembly of FIG. 1.

Top wall 10 of the housing, as shown in FIGS. 2 and 4, includes a pair of interiorly projecting ribs 36a and 36b which define a channel therebetween; similarly, bottom wall 12 has interiorly projecting ribs 38a and 38b, defining a corresponding opposed channel.

In the apparatus of the present invention, film pack means designated generally by reference numeral 42 are supplied and are mounted within the cavity of housing 2. Film sub-assembly 42 includes ribs 44 and 46 which are adapted to fit within the channels defined by ribs 36a, 36b, and 38a, 38b respectively. It will be appreciated that only one pair of channels have been illustrated with respect to that formed by ribs 36a, 36b, 38a and 38b; a plurality of such channels will be formed within the cavity of housing 2 whereby film sub-assembly 42 may be adjustably mounted with respect to the distance it is located from lens 34. Preferably, such channels defined by the ribs would be evenly spaced in suitably small increments.

Film sub-assembly 42 includes shutter means comprising a pair of shutters 48 and 50 which may be a pair of shutters outwardly movable on hinges 49 and 51 respectively. Shutter actuator means 60 are also provided for opening and closing shutters 48 and 50. When closed, shutters 48 and 50 bar the entry of any light to the film.

Film sub-assembly 42 also includes self-developing film generally designated by reference numeral 56. Such self-developing film may be any suitable known to those skilled in the art and for example, may include such self-developing film as is marketed under the trademark "Polariod". In this respect, the film normally includes tab means 58 for withdrawing the film after exposure.

Mounted intermediate shutters 48, 50 and film 56 is focusing plate 52 which is opaque and slidably mounted within film sub-assembly 42. Focusing plate 52 is preferably of a material allowing the visual inspection of an image formed thereon. Means comprising a tab 54 are provided for inserting and removing the plate 52.

Shutter actuator means 60, as aforementioned, are adapted to open and close shutters 48 and 50 via rotation about hinges 49 and 51 respectively. As such, shutter actuator means 60 may comprise means known to those skilled in the art as e.g. cable and spring means, etc.

According to the method of the present invention, a positive image containing a portion desired to be reproduced is mounted on retaining means 32. Film is placed in the film sub-assembly 42 which in turn is mounted within a channel formed by ribs such as the aforementioned 36a, 36b, etc. Sliding panels 14 and 16 are left open and shutter actuator means 60 are deployed to open shutters 48 and 50 and retain the same in an open position. However, light is not permitted to strike the film within the film pack 42 due to opaque focusing plate 52 which is mounted therein.

By following the above steps, rays of light striking the positive image mounted on retaining means 32 pass through lens 34 and form a further image on focusing plate 52. The correct focusing with respect to the clarity of the image formed on focusing plate 52 and also the portion of the positive image mounted on retining means 32 can then be attained by slidably moving mounting means 4 and if desired, at the same time changing the location of film pack 42 by mounting the same in a further channel.

Once the correct focusing has been achieved, shutters 48 and 50 are closed to prevent any light passing therethrough. Focusing plate 52 is then removed and sliding panels 14 and 16 closed to make housing 2 substantially light-tight. Following the above steps, shutter actuating means 60 may then be deployed to re-open shutters 48 and 50 following which the shutter associated with the lens is activated for the correct period of time to allow exposure of film 56. The self-developing film may then be removed and a positive image is obtained of the image to be reproduced.

In the apparatus above-described and to achieve the best results, it is important that focusing plate 52 be mounted proximate film 56 whereby the image shown on focusing plate 52 will be substantially the same image seen by film 56.

In further embodiments of the present invention, mounting means 4 may include a light source adapted to provide light for the positive image on retaining means 32. In such an embodiment, the light source may be such so as to allow a fixed time exposure for the apparatus.

Lens 34, as aforementioned, may be chosen from any number of suitable lens commercially available. Lens 34 may also be removably mounted within wall 31 of enclosure 2 to permit replacement thereof by further lens according to the desired result.

Figure 7:
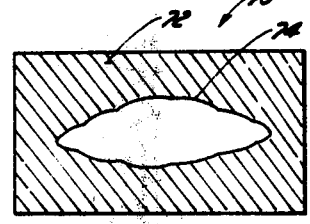
FIG. 7 is an elevational view of a further embodiment utilizing an inserter.

In a still further embodiment, and as is illustrated in FIG. 7, an inserter means may be provided. Inserter plate 70 comprises an opaque portion 72 surrounding a transparent portion 74. In this respect, transparent portion 74 may be of a clear transparent material such as glass, various thermoplastic materials, or alternatively, may simply conprise a cutout portion within inserter 70.

In operation, inserter 70 may be sized so as to fit within film pack 42 when focusing plate 52 is removed. By so doing, only the transparent or cut-away portion will permit passage of light from the positive image to be reproduced and thus, a photograph or picture having a border portion is formed.

Figure 8:
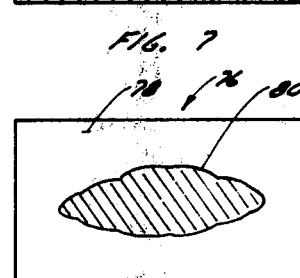
FIG. 8 is an elevational view of a different inserter.

In conjunction with inserter 70, there may be utilized a further inserter generally designated by reference numeral 76 in FIG. 8. As shown, inserter 76 includes a clear or transparent portion 78 surrounding an opaque portion 80. In this embodiment, opaque portion 80 is of equivalent dimensions to transparent portion 74 in FIG. 7. In utilizing inserter 76, two images may be formed on the same frame of the film whereby a central portion consists of one image and a further border portion is provided of a different image.

In the above-described embodiment, it is again important that the inserters be as close as possible to film 56 so as to provide a clear line of demarcation between the exposed and unexposed portions or borders. Although inserters 70 and 76 may be sizes so as to fit within film pack 42 in place of focusing plate 52, a separate channel may be provided within film pack 42 to allow for the placement of the inserters. In this respect, the inserters may be placed within the film pack either before or after focusing plate 52.

Still further, the focusing plate may in itself comprise the outer surface of shutters 48 and 50 thus obviating the necessity for a separate plate. Also, shutters 48 and 50 and/or focusing plate 52 may include means thereon indicating what portion of the image will be reproduced according to the configuration of the inserter plate.

It will be recognized that the above described embodiment is a preferred one only, and that changes and modifications may be made to the apparatus and method of the present invention without departing from the spirit and scope thereof.

I claim:

1. An apparatus suitable for the reproduction of a positive image, said apparatus consisting essentially of a housing, a lens means mounted in one end of said housing, first shutter means associated with said lens means, first actuating means for actuating said first shutter means, a film sub-assembly, means for adjustably mounting said film sub-assembly within said housing at variable distances from said lens means, said film sub-assembly comprising self-developing film, second shutter means, a focussing plate interposed between said second shutter means and said self-developing film, and second actuating means for actuating said shutter means, and a positive image mounting means, said positive image mounting means being slidably adjustable in distance with respect to said lens means and said film sub-assembly.

2. The apparatus of claim 1 additionally including an inserter plate mountable between said second shutter means and said self-developing film, said inserter plate having at least one opaque portion and at least one transparent portion.

* * * * *